July 20, 1965 H. F. BEAN 3,195,887

SHEET TRANSPORT SYSTEM

Filed Sept. 11, 1961 2 Sheets-Sheet 1

July 20, 1965 H. F. BEAN 3,195,887

SHEET TRANSPORT SYSTEM

Filed Sept. 11, 1961

2 Sheets-Sheet 2

United States Patent Office 3,195,887
Patented July 20, 1965

3,195,887
SHEET TRANSPORT SYSTEM
Harley F. Bean, Dallas, Tex., assignor, by mesne assignments, to Sperry Rand Corporation, New York, N.Y., a corporation of Delaware
Filed Sept. 11, 1961, Ser. No. 137,363
3 Claims. (Cl. 271—53)

This invention relates to handling material in sheet form and more particularly to a system for handling documents of different sizes and thicknesses and characterized by continuous frictional wiping of opposite faces of a given document for application of moving forces in the direction of transport.

In machines which operate on or are operated by paper documents a problem arises when documents of different sizes and thicknesses must be handled. In such a system where documents such a bank checks, punched cards and the like are operated on or information printed or punched thereon is sensed, it is necessary to establish accurately a predetermined position of a given document at each of a plurality of stations. Further, the documents must be moved from one station to another serially without jamming and be deposited at their destination in an array which is orderly and predetermined. In imprinting machines where characters or indicia are to be applied to a given document, the document must be moved along a given transport path to an operating station where the document is either punched or printed with coded information, thereby rendering the document useful in connection with any one of a number of various systems.

In accordance with the present invention there is provided a document handling system in which there is provided a guideway having a floor and parallel side walls which form an elongated channel. Disks of resilient fibers mounted on opposite sides of the channel meet tangentially at a common plane within the channel. Means are then provided for mounting the disks on axes which are parallel to the sides of the channel and to each other but which are tilted towards the plane of the floor. Drive means are then provided for oppositely rotating the disks for movement of the tips of the fibers at the common plane in a direction which has a component directed toward the floor and a component parallel to the floor for maintaining the bottom edge of the document on the floor while propelling the document through the channel. In a preferred embodiment of the system document stops are provided adjacent to an operating station whereby the continuous application of a wiping force at corresponding point on the opposite faces of the document maintains the document against the stops and against the floor for accurate positioning thereof relative to the operating station.

For a more complete understanding of the present invention and for further objects and advantages thereof, reference may now be had to the following description taken in conjunction with the accompanying drawings in which.

Referring now to FIGS. 1–4, the document handling system in acordance with one embodiment of the present invention is adapted to receive a document 10 at an input station A and to transport the same to a document treating station B at an intermediate point along the transport system and then to deposit the document at an output station C.

Figure 2:
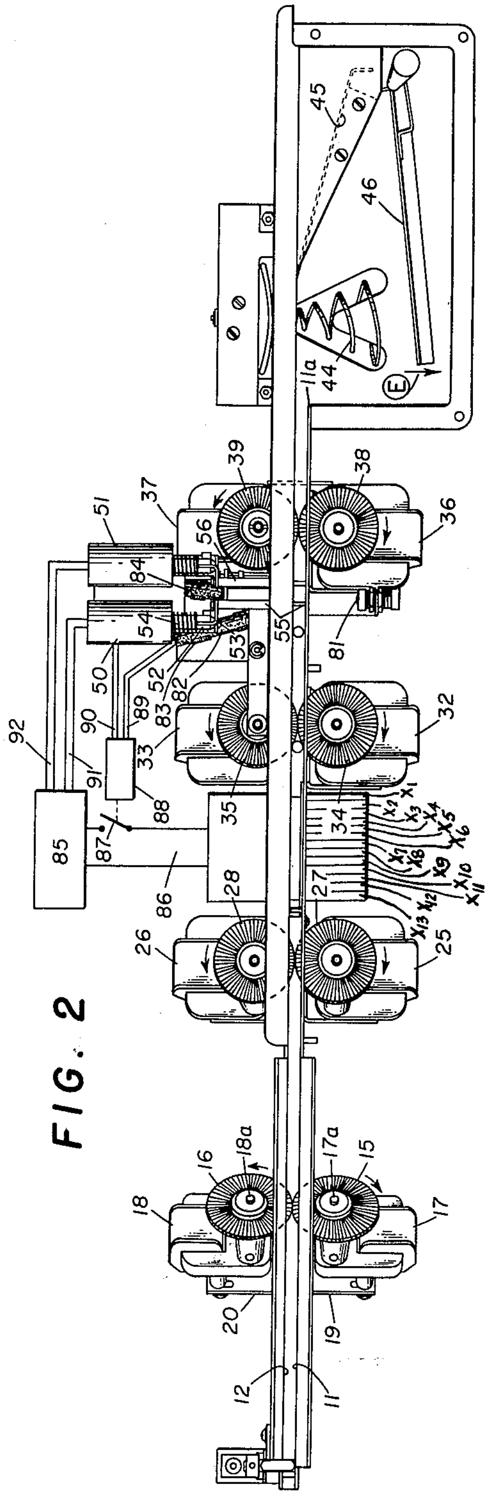
FIG. 2 is a top view of the system of FIG. 1.
Figures 3, 4:
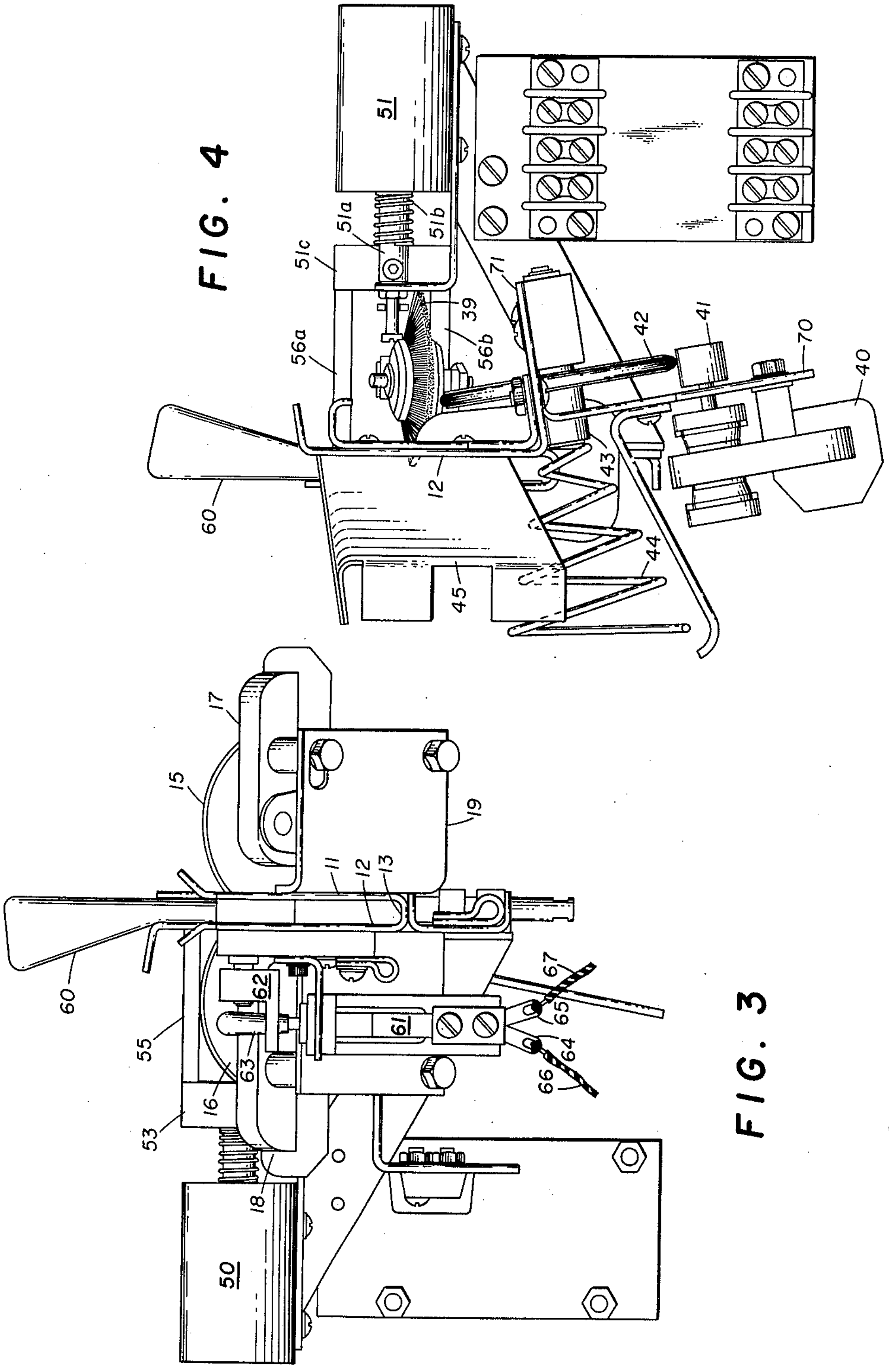
FIG. 3 is a view of the system of FIG. 1 taken from the left end as along lines 3—3 of FIG. 1.
FIG. 4 is a view taken from the right hand end as along lines 4—4 of FIG. 1.

The document handling system is characterized by structure which forms an elongated document channel or way, best seen in FIG. 3, which has a floor 13 and side walls 11 and 12. The side walls 11 and 12 are maintained in a fixed, closely spaced relationship and in a preferred embodiment are vertical with the floor 13 substantially horizontal. As best seen in FIG. 2, the rear wall 12 extends continuously from the left end of the system to the right hand end. However, the front wall 11 terminates at point 11*a*, the entry to a stacking bin at the output station C.

At the input station the front wall 11 supports a motor 17 which is mounted on a bracket 19, the latter being secured to the wall 11. The motor 17 has a shaft 17*a* on which there is mounted a fiber bristle disk 15. The motor 17 is mounted with the shaft 17*a* parallel to the wall 11. However, the shaft is tilted forward, that is, in the direction of movement as represented by the arrow D. The angle formed between the shaft 17*a* and floor 13 is about 45°. The tips of the fibers forming the fiber disk 15 extend through a slot 19′ in the wall 11. The slot 19′ is an elongated slot perpendicular to the shaft 17*a*. Thus, the fibers extend into the document channel in the manner best seen in FIG. 2. Preferably the motor 17 is mounted on bracket 19 such that the tips of the brush 15 extend to the center plane of the document way.

Figure 1:
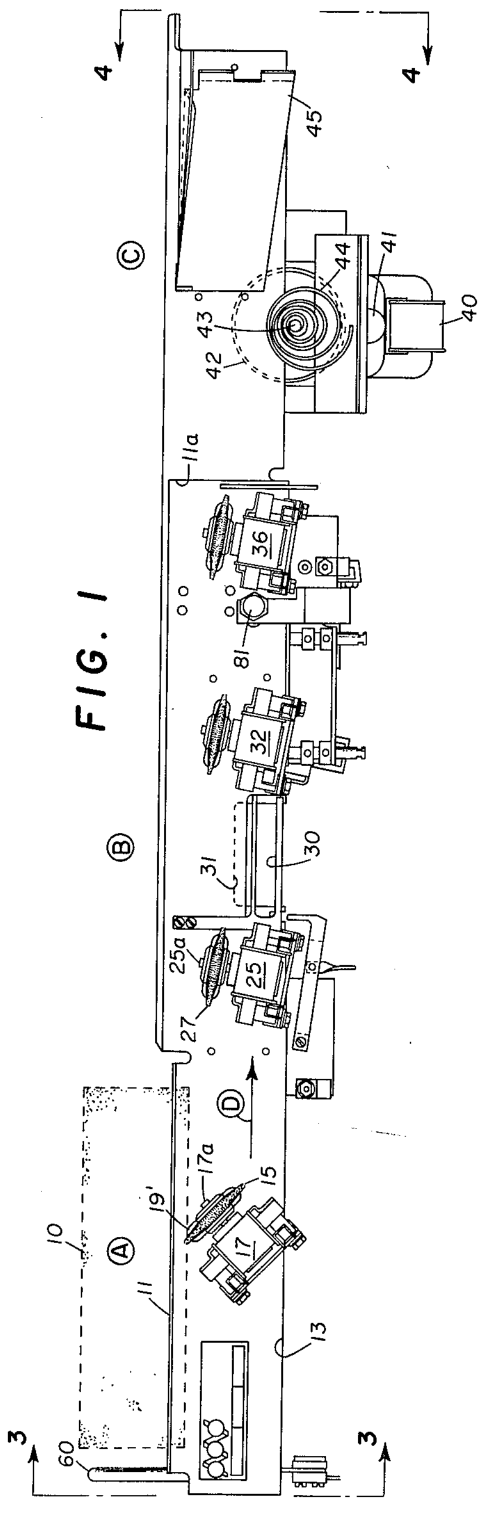
FIG. 1 is a side view of a document transport system embodying the present invention.

In a similar manner a motor 18 is mounted on a bracket 20 which is secured to the rear wall plate 12. Motor 18 has a drive shaft 18*a* on which there is mounted a second fiber disk 16. Motor 18 is mounted with the shaft 18*a* parallel to the rear wall 12 and is tilted such that it is parallel to the axis 17*a*. The tips of the brush 16 extend through a slot in the rear wall 12 which is in registration with the slot 19′ in the front wall 11*a*. Thus the tips of the brushes 15 and 16 meet tangentially at the center of the document channel. The motors 17 and 18 are energized from a suitable source (not shown) so that they rotate the brushes 15 and 16 in opposite directions. As viewed in FIG. 2, the brush 15 rotates in a clockwise direction and the brush 16 rotates in a counterclockwise direction. With the motors thus energized and the brushes rotating, if the document 10, FIG. 1, is dropped downward into the document way, there is immediately applied to the faces of the document a continuous wiping action. Since the bristles on the brushes are fibrous, they will not damage the surface of the document 10. However, a moving force is continuously applied to the document 10. One component of such force is directed downwardly toward the floor 13. A component of equal magnitude is directed along the direction of arrow D. Thus, the document at the input or loading station A immediately will be propelled to position the same with the bottom edge in registration with the floor 13 of the document channel. Thereafter the document 10 moves along the length of the channel toward the operating station B.

At a point intermediate the loading station A and the operating station B there is provided a second set of document transport motors. More particularly, a first motor 25 is mounted on the wall 11 and a second motor 26 is mounted on the rear wall 12. Motors 25 and 26 serve to drive fiber brushes 27 and 28, respectively. The brushes 27 and 28 have the tips thereof extending through elongated slots in the front wall 11 and the rear wall 12, respectively. As in the case of the brushes 15 and 16, the brushes 27 and 28 extend to the center plane of the document channel and thus the tips of the brushes maintain peripheral contact with one another. Brushes 27 and 28 rotate in opposite directions, the same as brushes 15 and 16, respectively. It will be noted, however, in FIG. 1 that the axis 25*a* of motor 25 is not tilted to the degree that shaft 17*a* of motor 17 is tilted. Shaft 25*a* is tilted only slightly, about 10° to 15°. As document 10 is engaged by the wheels 27 and 28, the principal component of force applied by the wiping action of the brushes 27 and 28 to the faces of the document is along arrow D. A minor component is directed downwardly toward the floor 13.

At the operating station B there is provided an imprinting device X, FIG. 2, representative of devices adapted to impress or punch characters or information on document 10 in the portion of the document in registration with the window 30 in the front wall 11, FIG. 1. A similar but larger window 31, the outline of which is shown dotted, is provided in the rear wall 12.

Immediately downstream of the windows 30 and 31 there is provided a pair of motors 32 and 33. Motors 32 and 33 serve to drive brushes 34 and 35, respectively. The brushes 34 and 35 are mounted generally the same as the brushes 27 and 28 so that they extend into the center of the document channel and serve to apply forces to the document 10 as it travels thereby.

A fourth set of motor driven brushes is provided between the operating station B and the stacking bin C. More particularly, the motors 36 and 37 drive brushes 38 and 39, respectively. It will be noted that the motors 25, 32 and 36 are mounted with their axes parallel to each other and to the plane of the walls 11 and 12.

Immediately downstream of the brushes 38 and 39, the front wall 11 is terminated so that the documents may be stacked in a bin at station C. As seen in FIGS. 1 and 4, a motor 40 serves to drive a wheel 41. Wheel 41 is maintained in contact with the large frictional drive wheel 42 which is mounted on a shaft 43. Shaft 43 extends through the rear wall 12 of the document way. The front end of the shaft 43 carries a spiral stacking element 44. Wheel 42 rotates in a clockwise direction as viewed in FIG. 1. As documents are moved from the operating station B to the output station C, the lead end of the document is inserted between adjacent turns of spiral elements 44. As the motor 40 drives the stacking element 44, the document is then moved outwardly in the direction of arrow E, FIG. 2. The lead edge of the document travels along the wall of a guide plate 45 so that the document moves bodily in a direction substantially perpendicular to the plate 12. As the document moves in the direction of arrow E, it comes into contact with a back-up plate 46 which is resiliently urged (by a spring not shown) in a direction opposite the arrow E to maintain the face of the last document deposited in the stacking bin against the free end of the spiral stacking element 44.

As best seen in FIG. 2, a pair of solenoids 50 and 51 are mounted on a bracket affixed to the rear wall plate 12. Solenoids 50 and 51 are adapted to retract stop elements from the document way in response to preselected control functions. As illustrated in FIG. 2, the solenoid 50 has an armature 52 which carries an angle bracket 53. A spring 54 normally biases the armature 52 toward the document way. A stop bar 55 is carried by the bracket 53 and extends through a slot (not shown) in the rear wall plate 12 of the document way. The stop element 55 thus serves as a block along the document travel path. The stop element 55 preferably is a planar element such that it may contact a substantial segment of the leading edge of any document.

The second solenoid 51 is provided with a similar set of components for the control of a second stop element 56. The stop elements 55 and 56 are located at different points along the length of the document way so that documents may be encoded at either of two preselected sites with reference to the leading edge of the document. That is to say, a location on a given document at which information is to be imprinted as in the present example may be varied in dependence upon which of the two solenoids is de-energized. While two such stops have been shown, it will be understood that further stops may be added so that documents of assorted lengths may be accommodated.

In operation, the document 10 is dropped manually into the slot at the loading station A. The wheels 15 and 16 immediately shoot the document forward and downward into contact with the floor 13. The document is then propelled into contact with the brushes 27 and 28. The brushes 27 and 28, having a greater component in the direction of the length of the document way, increase the speed of the document and shoot it along the document way into contact with the brushes 34 and 35. The brushes 34 and 35 move the document until it reaches stop 55 or stop 56. At this point the wheels 34 and 35 continue to apply a wiping force which has a major component in the direction of arrow D and a minor component in the direction of the floor of the channel. The wiping of the brushes on the arrested document maintains the document in a predetermined position relative to the imprinter X so that for every document the materials imprinted thereon will be placed in precisely the same location. Such documents may then be utilized in subsequent data handling systems without fault from improper location of the imprinted materials.

In FIGS. 1 and 2 there is illustrated means for sensing the position of a given document upon the arrival at a stop location. Two light-sensitive sensing systems are employed which respond to light from a lamp 81 mounted on a bracket adjacent to the brush motor 36. Light from the lamp 81 passes through apertures in the walls 11 and 12 (not shown) and is received by a first photo cell or light-sensitive detector 82. The detector is mounted by brackets 83 in such a position that when a document in the document way is arrested in its travel by the stop 55, the cell 82 will energize the encoding device X to permit the document to be encoded at a site thereon which is determined by the distance between stop 55 and the encoder mechanism X. A second light-sensitive detector 84 is provided for sensing the arrival of the leading edge of a document at the stop 56.

A source represented by the unit 85 is connected to the encoding device X by way of circuit 86 for energizing the encoding device X. The circuit 86 is completed by way of a normally open switch 87 which may be actuated under the control of a unit 88. Unit 88 is connected by way of conductors 89 to the photoelectric detector 82 and by way of conductors 90 to the detector 84. The unit 88 may be a relay which closes the switch 87 to energize the keyboard 85 and the selected type bars X upon the positioning of a document between the light source 81 and either of the photoelectric detectors 82 and 84. Such an arrangement may be that as shown in the Patent to Mauch 2,907,833 or the patent to Ett 2,922,893. The control unit 85 may include a hand-operated keyboard or other suitable control for the encoding unit X. Unit 85 may be connected to solenoids 50 and 51 as by channels 91 and 92 to energize them, following encoding of each document, to retract stops 55 and 56. The initiation of the control operation as diagrammatically represented by the switch 87 is dependent upon the arrival of a document at one of the two stops 55 or 56. Where the unit 85 is a hand-operated keyboard, the document 10 may be encoded with the sequence of operations indicated in the drawings of the FIGURES 1 and 2. More particularly, an operator observing the amount, for example, of a check such as the document 10, will set the amount in the keyboard of the unit 85. Thereafter, the document 10 is dropped into the slot between the guides 11 and 12. The brush 15 first contacts the document 10 forcing it downwardly and to the right as viewed in the FIGURE 1. It successively is engaged by the brushes 27, 28 and 34, 35. Its movement is arrested as it reaches the stop 55. The stops 55 and 56 are both shown blocking the document way. In normal operation, the switch handle 60 would be positioned to select either the stop 55 or the stop 56 and the non-selected stop would be withdrawn from the document way. Assuming that the stop 55 is selected, the stop 56 would be withdrawn and at the instant the document reaches the stop 55, light from the source 81 impinging upon the photo-cell 82 generates a control pulse which, through the unit 88, closes the switch 87. This simultaneously closes a circuit to the encoder X to actuated selected ones of the printer bars, $X_1$, $X_2$–$X_{13}$, in dependence upon the amounts set at the keyboard 85. At the same time, the keyboard device 85 closes a circuit to energize a solenoid 50 to retract the stop 55 from the document way. As soon as the selected ones of type bars $X_1$–$X_{13}$ are retracted, the document 10 is moved on the way through brushes 38, 39 to the Pocket C under the control of the brushes 34, 35 and 38, 39. A similar situation would prevail in the event the stop 56 were selected except that encoding would take place at a different position on the document 10. The control elements have been shown in block form since in and of themselves they are well-known in the art. They are brought into a relationship in accordance with the present invention which brings into coaction the stops, the encoding unit and the transport units for precision transport and encoding control.

Illustrated in FIG. 3 is a view of the system from the left end. The brushes 15 and 16 are shown mounted on motors 17 and 18. Bracket 19 is shown as it supports the motor 17.

In the left end of the document way as viewed in FIG. 1, there is provided a switch having handle 60. The handle 60, FIG. 3, serves to actuate a switch unit 61 through a linkage including the bracket 62 which engages the arm 63 of a toggle switch. The switch terminals 64 and 65 are then connected by way of conductors 66 and 67 to a circuit which controls the solenoids 50 and 51. When arm 60 is moved to the left as viewed in FIG. 1, the switch 61 may be positioned to be in a closed circuit condition to close a circuit by way of conductors 66 and 67 to energize the solenoid 50. In this condition every document will be permitted to pass stop 55 and be arrested only by stop 56. The switch arm 60 will be actuated in one or the other of two positions, depending upon the encoding site to be selected. The position of the solenoid 50 is readily apparent in FIG. 3 along with the bracket 53 and the document stop element 55.

As best seen in FIG. 4, two document stop elements are controlled by each of the solenoids. More particularly, in FIG. 4 the solenoid 51, having armature *51a* biased toward the document channel by spring *51b*, has a bracket *51c* mounted thereon. The bracket *51c* then carries a pair of arms *56a* and *56b*. The arms *56a* and *56b* normally extend into the document way to arrest travel of each document at the operating station. Arms *56a* and *56b* are retracted upon energization of the solenoid to permit an encoded document to travel on to the stacking bin.

Further, as viewed in FIG. 4 the document stacking mechanism is illustrated as including the motor 40 which is mounted on a bracket 70 which extends downwardly from a flange 71 of the rear wall plate 12. The motor 40 drives the wheel 41 which in turn drives the follower wheel 42 secured to shaft 43.

The structure illustrated in the drawings may be mounted onto a desk or table top with the upper edge of the document channel lying generally at about the plane of the table top. The stacking pin at the output station C, though recessed in the table top, is open at the top so that the documents stacked therein are readily accessible. Furthermore, the document 10 at the input station A may be readily dropped into a slot in the working surface at the input station so that the input and output stations both are accessible and yet all of the transport and encoding mechanisms may be maintained beneath the working surface.

Having described the invention in connection with certain specific embodiments thereof, it is to be understood that further modifications may now suggest themselves to those skilled in the art and it is intended to cover such modifications as fall within the scope of the appended claims.

What is claimed is:

1. A document handling and encoding system including a plurality of work positions comprising a document input station having a floor and a pair of closely spaced vertical walls, said walls being flared away at their upper extremities from the vertical position to more readily receive documents, a document channel extending horizontally from said input station and in alignment therewith and having a floor and closely spaced parallel sides, an output hopper communicating with said channel for receiving documents therefrom, a plurality of pairs of independently driven motors mounted at driving stations along said channel, one pair of motors positioned at said input station, with one motor of each of said pairs positioned on one side of said channel and the other motor on the other side thereof with the axis of each pair parallel, one to the other, and to the planes of said sides and tilted away from said input station, a disc-like fiber brush mounted on each of said motors and driven thereby with each of the brushes extending through the side adjacent thereto into a tangent relation one with the other within said channel wherein said brushes are driven as to have a primary component of movement within said channel away from said input station and a secondary component of movement directed downwardly towards said floor, said plurality of pairs of motors being driven at substantially the same speed and mounted at progressively increasing distances away from said input station and with their axis being tilted to a progressively lesser degree with distances from said input station, a first document stop extending into said channel and defining a first work position, a second document stop also extending into said channel, downstream from said first document stop, and defining a second work position, means positioned adjacent said document input station for manually selecting one or the other of said work positions by causing a withdrawal of the first document stop upon selection of said second work position, and withdrawal of the second document stop upon selection of said first work position, sensing means for detecting the arrival of a document along said channel at said first or second work positions, and means coupled from said sensing means for withdrawing the appropriate stop after completion of the work at the selected work position to permit the advancement of a document to the output hopper.

2. The combination as defined in claim 1 wherein said sensing means is a photo-electric detector.

3. The combination as defined in claim 1 including a solenoid coupled to each stop for actuation thereof.

References Cited by the Examiner

UNITED STATES PATENTS

| | | | |
|---|---|---|---|
| 521,565 | 6/94 | Ethridge | 271—53 |
| 1,196,934 | 9/16 | Droitcour | 271—53 |
| 2,369,794 | 2/45 | Phinney et al. | 271—53 |
| 2,992,821 | 7/61 | Whitney | 271—53 |
| 2,995,364 | 8/61 | Frederick et al. | 271—52 |

ROBERT E. PULFREY, *Primary Examiner.*